United States Patent [19]

Ketels

[11] Patent Number: 5,702,295
[45] Date of Patent: Dec. 30, 1997

[54] DEVICE FOR POSITIONING FISH

[75] Inventor: Dieter Ketels, Kühsen, Germany

[73] Assignee: Nordischer Maschinenbau Rud. Baader Gmbh & Co KG, Lubeck, Germany

[21] Appl. No.: 665,412

[22] Filed: Jun. 18, 1996

[30] Foreign Application Priority Data

Jun. 20, 1995 [DE] Germany ............ 195 22 238.5

[51] Int. Cl.$^6$ ............................................ A22C 25/08
[52] U.S. Cl. ........................................ 452/180; 452/182
[58] Field of Search ............................... 452/180, 153, 452/157, 163, 170, 182

[56] References Cited

U.S. PATENT DOCUMENTS

| | | | |
|---|---|---|---|
| 4,084,294 | 4/1978 | Dohrendorf | 452/182 |
| 5,259,810 | 11/1993 | Evers et al. | 452/180 |
| 5,330,383 | 7/1994 | Ryan | 452/182 |
| 5,354,232 | 10/1994 | Pontow | 452/180 |
| 5,492,502 | 2/1996 | Hjorth | 452/157 |

FOREIGN PATENT DOCUMENTS

| | | | |
|---|---|---|---|
| 2241/72 | 1/1972 | Denmark . | |
| 1400330 | 4/1965 | France | 452/180 |
| 91 328 | 10/1971 | Germany . | |
| 29 39 625 | 4/1981 | Germany . | |

*Primary Examiner*—Willis Little
*Attorney, Agent, or Firm*—Fay, Sharpe, Beall, Fagan, Minnich & McKee

[57] ABSTRACT

An apparatus for automatically positioning fish with respect to their plane of symmetry and for the periodic transfer of the fish to a fish processing machine is proposed. The apparatus comprises a supply conveyor in the form of a trough conveyor and a feed conveyor arranged below and essentially perpendicular to the supply conveyor for feeding the fish into the processing machine. The feed conveyor includes a support conveyor equipped with support elements onto which each fish is placed with the support elements protruding into the belly cavity. This is achieved by a holding element which is arranged between the supply conveyor and the feed conveyor and is controlled by a signal to open and release the temporarily held fish. The generation of the signal is varied according to a measurement value representing the size of the fish being positioned so that each fish is released to land exactly positioned with its belly cavity on a support element irrespective of its size.

5 Claims, 2 Drawing Sheets

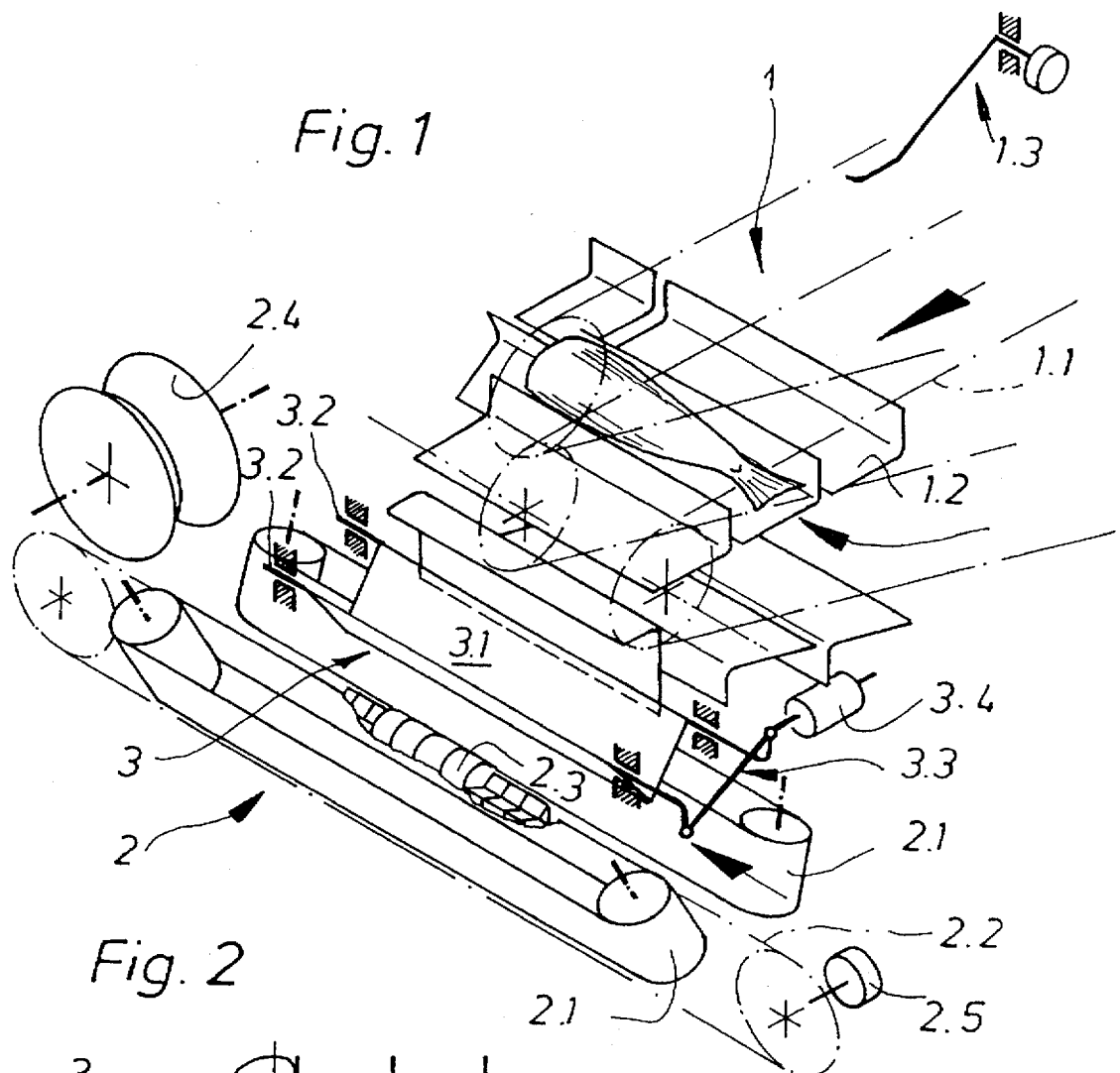
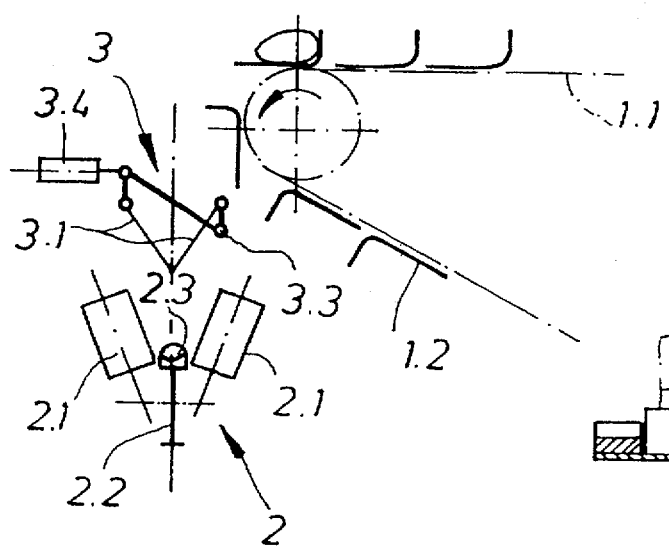
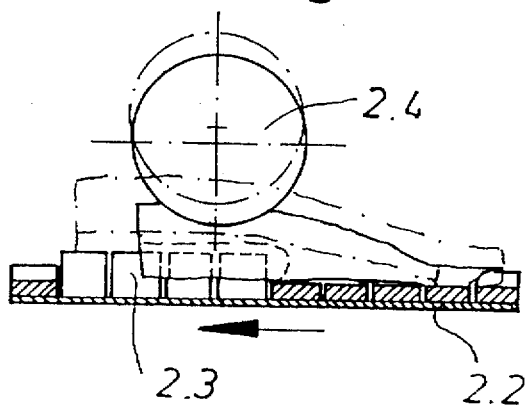

DEVICE FOR POSITIONING FISH

BACKGROUND OF THE INVENTION

1. Field of the Invention

The invention concerns an apparatus for automatically positioning decapitated fish with respect to their plane of symmetry and for the periodic transfer of said fish to a fish processing machine in which the fish are processed in an upright position with their tails trailing, the apparatus comprising a fish delivery device including a supply conveyor on which the fish are advanced with their decapitation faces aligned, a feed conveyor arranged below the delivery device for receiving fish from the supply conveyor and having an endless support conveyor with support elements arranged in spaced relationship thereon, and means for holding down fish engaged by the support conveyor.

2. Prior Art

An apparatus of this kind is disclosed in DE-B-29 39 625. This apparatus comprises a delivery device in the form of a trough conveyor having transversely arranged pivoting troughs in which the fish are conveyed in a uniform position lying on one side and, after having been decapitated, with the head cut faces lying in one plane. The fish are dropped into a feed conveyor, which is composed of side belts and a support conveyor, and are advanced lengthwise by the support conveyor in a swimming position and direction. The support conveyor has support elements equidistantly spaced along its length for supporting the fish in the region of the belly cavity. The speeds of the trough conveyor and the feed conveyor are set to correspond to one another such that each fish lands on a support element after being released from the trough conveyor. The fish are then uniformly aligned with respect to their plane of symmetry by means of a roller-like pressing element, which pushes the fish downwards onto the support elements, indenting the belly skin until the lateral backbone appendages lie indirectly on the support element.

A disadvantage associated with this apparatus is that the time interval between the fish being released from the trough conveyor and landing on the support conveyor varies due to indeterminate influencing factors, such as differences in consistency, surface characteristics and the mass of the fish and the like. As a result, the time the fish takes to land and hence the position of the fish with respect to the support elements of the feed conveyor cannot be accurately predicted.

Furthermore, it is evident that this concept cannot be modified to accomodate specific dimensions of individual fish, for example the length of the belly cavity, so that the optimal positioning will at most be attained for fish of average size.

In a further apparatus known from DK 2241/72, fish are fed to a conveyor in accordance with the working period of the processing machine by means of a retaining element, which temporarily retains the fish and releases the fish in sychronization with the machine period. However, this element serves purely as a buffer element, which allows the operator to supply the fish to the machine at any moment in time, i.e. independent of the machine timing, but then transfers the fish according to the fixed working period of the machine by means of an opening or activation organ moving in parallel with the conveyor belt. In this arrangement it is important that the fish are arranged roughly in a position in which they can be engaged behind the head by an entrainer and conveyed through the machine. The retaining element is opened and the fish released when an activation organ travelling with the conveyor belt passes by irrespective of the size of the fish.

Furthermore, a device is known from DD-B-91 328 which operates in a similar manner to the above-described device and with which fish transported by a grooved feed conveyor are transferred when the groove is opened to a further conveyor lying thereunder which advances each fish transversely to its longitudinal axis. The transfer of each fish occurs when the fish in question abuts against a stop element installed in its path. The transfer of the fish is thus also purely mechanical and dependent solely on the arrival of the fish. Furthermore, since it is essential in this device that the front ends of the fish are equidistantly positioned in the second conveyor, there is no possibility that the processing can be adapted to cope with a wide variation of fish sizes.

3. Objects of the invention

It is thus an object of the invention to provide an apparatus, with which the above-mentioned influencing factors are eliminated to the greatest possible extent.

It is a further essential object of the invention to provide an apparatus with which each fish can be positioned optimally according to its size to achieve exact alignment for subsequent processing.

SUMMARY OF THE INVENTION

In an apparatus for automatically positioning decapitated fish with respect to their plane of symmetry and for the periodic transfer of said fish to a fish processing machine, in which the fish are processed in an upright position with their tails trailing, wherein the apparatus comprises a fish delivery device including a supply conveyor on which the fish are advanced with their decapitation faces aligned, a feed conveyor arranged below the delivery device for receiving fish from the supply conveyor and having an endless support conveyor with support elements arranged in spaced relationship thereon, and means for holding down fish engaged by the support conveyor, these and further objects are achieved by providing means associated with said delivery device for determining at least one fish measurement value and wherein the apparatus comprises fish holding means arranged between the supply conveyor and the feed conveyor and directly above the latter for temporarily holding fish discharged from the delivery device, and the holding means is associated with actuation means, which are arranged and controlled to activate the holding means so as to release fish in accordance with the determined fish measurement value.

The advantages achievable with this arrangement are specifically that each fish can be released at an individually determined time calculated according to its size. Furthermore, since the holding element reduces the fall distance between the two conveyors, the moment in time at which each fish lands on the feed conveyor can also be precisely predetermined. Each fish can thus be positioned on a support elements in an optimal position for subsequent processing.

According to an advantageous embodiment of the invention, the holding element can comprise a pair of wall elements or flaps arranged in a V-shape which can be controlled to move between a closed or fish holding position and an open or fish releasing position, in which they form a downwardly open chute. This arrangement allows the invention to be realized in a simple and clear manner both structurally and with regard to its operation. Furthermore, the opening operation of the wall elements can be particularly efficiently achieved when they are each arranged to pivot about an axis of rotation located in the upper portion of each element and are controlled to pivot sychronously in opposite senses.

The actuation means preferably comprise an actuation member which is operated to open the wall elements as a function of the position of a support element on the support conveyor. By virtue of this arrangement, the actuation member can be controlled exactly to operate the flaps in accordance with the fish size in such a way that the fish falls downwards through the chute at precisely the desired moment corresponding to the optimal position of the support element relative to the belly cavity so that the end of the belly cavity substantially abuts the end of the support element.

The actuation member can advantageously be activated by a signal which is generated as a function of the measurement value representing the size of the fish lying in the holding element. The time interval between two activation signals can thus vary according to the previously performed fish measurement. This has the effect that the time intervals becomes shorter as the fish size increases, provided the support elements are uniformly spaced and advanced at a constant speed. As a result, the larger fish will land on a support element earlier than a smaller fish so that the end, of the belly cavity of each fish is correctly positioned for the subsequent processing.

BRIEF DESCRIPTION OF THE DRAWINGS

Further objects of the present invention will be apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows an axonometric view of the transfer station of a fish processing machine, FIG. 2 shows a side view of the apparatus of FIG. 1, FIG. 3 shows a side view of the support conveyor.

DETAILED DESCRIPTION OF THE PREFERRED EMBODIMENTS

Figure 4:
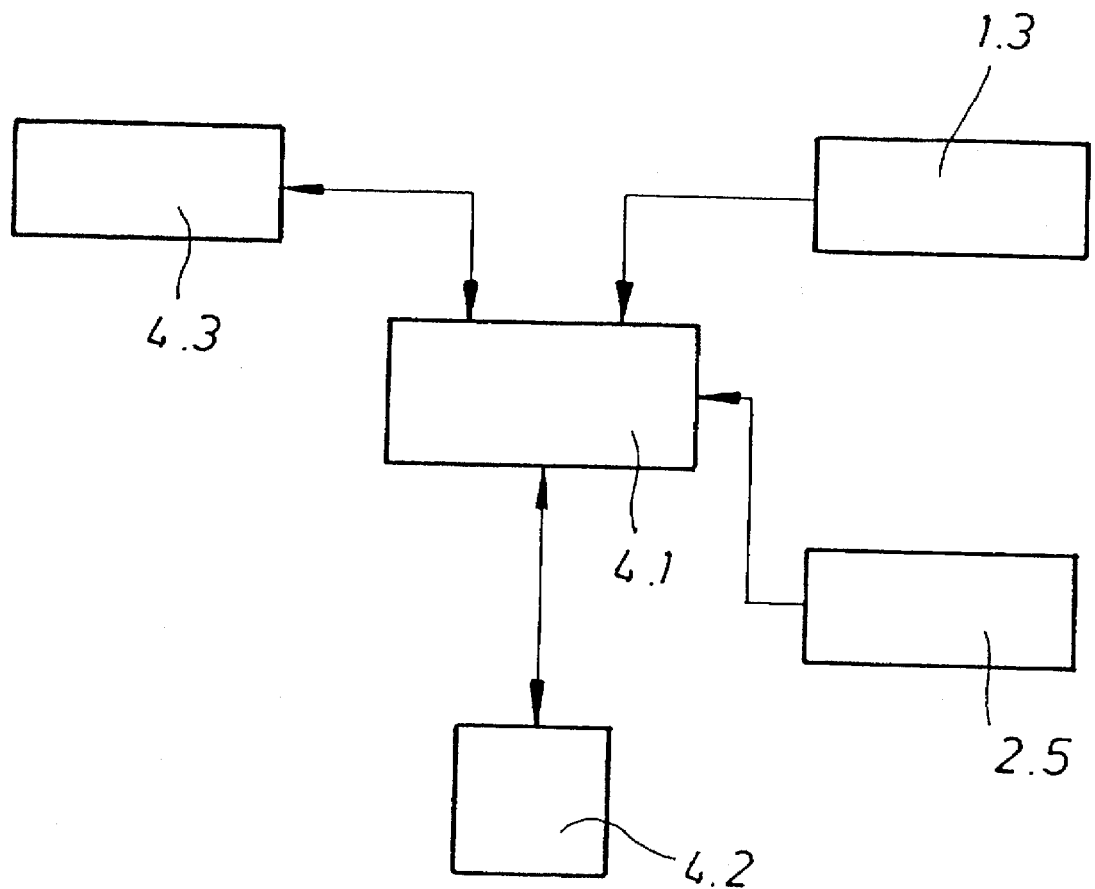
FIG. 4 shows a block diagram of the control of the holding element.

The apparatus according to the invention is part of a fish processing machine designed to remove the heads and bones of fish automatically. The preferred embodiment of such an apparatus comprises a supply conveyor 1, which conveys the fish sideways, a feed conveyor 2, which is located below the end portion of the supply conveyor 1 and is connected upstream of the deboning part of the machine, and a controllable holding element 3 which is arranged between the supply and feed conveyors 1, 2 for receiving the fish discharged from the supply conveyor 1.

The supply conveyor 1 preferably comprises as its main component a driven, endless trough conveyor 1.1, which is equipped with transversely arranged troughs 1.2. A measurement sensor 1.3 is associated with this conveyor for measuring the thickness of the fish about the head as they pass by, and the resulting measurement is used for determining the correct position of the head cut. The fish are then positioned accordingly and decapitated with appropriate cutting means to leave a decapitation face. As a result of this operation the fish are advanced with the decapitation faces being substantially in one plane. The measurement sensor 1.3 also inputs the measurement data into a computer 4.1.

The feed conveyor 2 comprises two endless flank conveyors which are arranged in a V-shape and driven synchronously. The flank conveyors 2.1 are provided with gripping active surfaces in the direction of movement. The base of the feed conveyor 2 is formed by an endless support conveyor 2.2, which is driven synchronously with the flank conveyors 2.1 to form a three-sided conveying channel. The support conveyor 2.2 extends beyond the flank conveyors 2.1 at its output end and carries support elements 2.3 distributed at regular and equal intervals along its surface which protrude into the conveying channel with an essentially convexly curved supporting surface. Between these support elements 2.3, the support conveyor 2.2 has an essentially V-shaped section. A pressing element 2.4 in the form of a resiliently arranged alignment roller is located above the extended portion of the support conveyor 2.2 and is provided with a prismatic guiding groove. A timing device 2.5 is associated with the support conveyor 2.2 and converts the movement of the support conveyor into a series of pulses indicative of the positions of the support elements 2.3. These pulses are also fed to the computer 4.1.

The holding element 3 is arranged directly above the feed conveyor 2 and comprises two wall elements 3.1 which are inclined in a V-shape towards one another and extend in the longitudinal direction of the feed conveyor 2 and symmetrically about the latter's plane of symmetry. The wall elements 3.1 are arranged to pivot about axes 3.2 which extend along the upper edge of each wall element. The wall elements 1.3 are coupled to one another with a synchronization mechanism 3.3 and are operated to pivot in opposite senses by means of an acutation member 3.4. This acutation member 3.4 is controlled by an actuation signal generated by the computer 4.1 and fed to the actuation member 3.4 via an operational component 4.2.

The function of the apparatus according to the invention will now be described with reference to the passage of a fish. The fish to be processed are positioned in a trough 1.2 of the supply conveyor either manually or automatically by means of fish aligner to lie uniformly on the same side and facing in the same direction as shown in the upper right-hand side of FIG. 1. The fish are then measured by the sensor 1.3 to determine their size, moved into the appropriate position for the head cut and decapitated. Each fish body then arrives at the end portion of the supply conveyor 1 and is thrown into the closed holding element 3, where it is caught with its decapitation face in a position determined by the head cut.

The measurement data received by the computer from the measurement sensor 1.3 represents the thickness of the fish head is used to determine the size of the fish and specifically the relative length of the belly cavity. With this data and the data received from the timing device 2.5, the computer 4.1 calculates an error value which represents the difference between the length of the belly cavity of the measured fish and a prestored value corresponding to the belly cavity length of the smallest fish which can be processed. This error value is used to correct the activation signal for the holding element 3 generated by the computer 4.1. The computer 4.1 is programmed such that the error value generated for the smallest fish to be processed is zero. This means that an uncorrected activation signal is generated at a point in time relative to the position of the support elements 2.3 such that a fish of this size lands correctly positioned on the support element 2.3. Accordingly, the error value generated for a larger fish causes the holding element 3 to be opened earlier. It will be apparent, however, that the computer may be programmed in a different manner without departing from the scope of the invention. Thus the stored reference value could correspond to a fish of average size and an error value be generated for both large and small fish. Irrespective of the details of the programme, the actuation signal is adjusted automatically to take into account the position of the belly cavity end relative to the position of the support elements 2.3, which varies with the size of the fish. In addition, a selection switch 4.3 can be used to adjust the generation time of the activation signal relative to the arrival of the support elements 2.3 in order to correct consitently occuring positioning errors.

I claim:

1. An apparatus for automatically positioning decapitated fish and for the periodic transfer of said fish to a fish processing machine, in which the fish are processed in an upright position with the decapitation face leading, the apparatus comprising first conveying means with which the fish are advanced with their decapitation faces in alignment, second conveying means, arranged below said first conveying means for receiving fish delivered by said first conveying means and having an endless support conveyor with support elements arranged in spaced relationship thereon, and means for holding down fish engaged by said support conveyor, wherein a) the apparatus includes means associated with said first conveying means for determining at least one fish measurement value;

b) said apparatus further comprises fish holding means arranged between said first conveying means and said second conveying means and directly above the latter for temporarily holding fish released from said first conveying means; and c) said holding means is associated with actuation means, which are arranged and controlled to activate said holding means so as to release fish in accordance with said determined fish measurement value.

2. An apparatus as claimed in claim 1, characterised in that said holding means comprises two wall elements arranged to form a V-shape and controlled to move between a fish holding position and a fish releasing position in which they form a downwardly open chute.

3. An apparatus as claimed in claim 2, characterised in that each said wall element is arranged to pivot about an axis of rotation arranged in upper portion of each wall element and that said wall elements are arranged to pivot synchronously about said axes in opposite senses.

4. An apparatus as claimed in claim 1, characterised in that said actuation means comprises an actuation member, which is adapted to be controlled to activate said holding means in accordance with a position of said support elements.

5. An apparatus as claimed in claim 4, characterised in that said actuation member is adapted to be activated by a signal generated as a function of said measurement value representing the size of the fish lying in said holding means.

* * * * *